US011025128B2

(12) United States Patent
    Kobayashi

(10) Patent No.: US 11,025,128 B2
(45) Date of Patent: Jun. 1, 2021

(54) PROTECTIVE COVER FOR ROTARY ELECTRIC MACHINE

(71) Applicant: Mitsubishi Electric Corporation, Tokyo (JP)

(72) Inventor: Yuzuru Kobayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/345,003

(22) PCT Filed: Nov. 16, 2016

(86) PCT No.: PCT/JP2016/083945
§ 371 (c)(1),
(2) Date: Apr. 25, 2019

(87) PCT Pub. No.: WO2018/092208
PCT Pub. Date: May 24, 2018

(65) Prior Publication Data
US 2019/0273411 A1 Sep. 5, 2019

(51) Int. Cl.
H02K 5/18 (2006.01)
H02K 11/04 (2016.01)
(Continued)

(52) U.S. Cl.
CPC ............... H02K 5/18 (2013.01); H02K 5/04 (2013.01); H02K 11/046 (2013.01); H02K 19/365 (2013.01)

(58) Field of Classification Search
CPC .......... H02K 5/18; H02K 5/04; H02K 11/046; H02K 16/365
(Continued)

(56) References Cited

U.S. PATENT DOCUMENTS 4,713,568 A * 12/1987 Adam ............... H02K 5/10
                                                310/112
5,959,385 A *  9/1999 Kato ............... F02N 15/046
                                                310/112
(Continued)

FOREIGN PATENT DOCUMENTS

CN   104170218 A   11/2014
CN   106026479 A   10/2016
(Continued)

OTHER PUBLICATIONS

Communication dated Oct. 25, 2019, from the European Patent Office in counterpart European Application No. 16922009.2.
(Continued)

Primary Examiner — Terrance L Kenerly
(74) Attorney, Agent, or Firm — Sughrue Mion, PLLC; Richard C. Turner

(57) ABSTRACT

A protective cover for a rotary electric machine including: a bottom portion formed into an approximately circular shape; a side wall extending from the bottom portion along an outer periphery thereof; and an opening portion, of approximately circular shape and formed by an end of the side wall, wherein the side wall has a plurality of guide ribs formed on an inner side thereof and arranged apart from each other along the outer periphery of the bottom portion, wherein each of the guide ribs has a chamfered portion at an end on a side closer to the opening portion, and wherein each of the guide ribs has a height of a top portion of each of the plurality of guide ribs from the side wall allows the top portion to contact a side surface of the component when the protective cover is mounted to the rotary electric machine.

9 Claims, 5 Drawing Sheets (a)

(b)

(51) Int. Cl.
*H02K 19/36* (2006.01)
*H02K 5/04* (2006.01)

(58) Field of Classification Search
USPC .......................................................... 310/89
See application file for complete search history.

(56) References Cited

U.S. PATENT DOCUMENTS

| | | | |
|---|---|---|---|
| 7,732,969 B2* | 6/2010 | Ishizeki | H02K 3/522 310/194 |
| 2010/0213788 A1* | 8/2010 | Guttenberger | H02K 1/148 310/216.135 |
| 2013/0057095 A1* | 3/2013 | Okinaga | H02K 3/522 310/71 |
| 2014/0225461 A1 | 8/2014 | Ohashi et al. | |
| 2014/0368094 A1 | 12/2014 | Kobayashi et al. | |

FOREIGN PATENT DOCUMENTS

| | | |
|---|---|---|
| EP | 1551092 A2 | 7/2005 |
| EP | 2224576 A2 | 9/2010 |
| JP | 60-51756 U | 4/1985 |
| JP | 11-299140 A | 10/1999 |
| JP | 5395192 B2 | 1/2014 |
| JP | 2016-021864 A | 2/2016 |

OTHER PUBLICATIONS

Communication dated Jun. 5, 2020, from the State Intellectual Property Office of the P.R.C. in application No. 201680090690.1.
International Search Report for PCT/JP2016/083945, dated Jan. 31, 2017.
Communication dated Nov. 10, 2020, from the European Patent Office in European Application No. 16 922 009.2.
Communication dated Feb. 26, 2021 by the China National Intellectual Property Administration in application No. 201680090690.1.

* cited by examiner (a)   (b)

PROTECTIVE COVER FOR ROTARY ELECTRIC MACHINE

CROSS REFERENCE TO RELATED APPLICATIONS

This Application is a National Stage of International Application No. PCT/JP2016/083945 filed Nov. 16, 2016.

TECHNICAL FIELD

The present invention relates to a mounting structure for mounting a cover, which is configured to protect a component of a rotary electric machine, to the rotary electric machine.

BACKGROUND ART

In Patent Literature 1, there is disclosed a vehicle AC power generator including a rotator, a stator, a rectifier, a voltage regulator, and a cylindrical protective cover. The rotator is disposed in a casing. The stator is supported by the casing. The rectifier and the voltage regulator are disposed outside the casing. The cylindrical protective cover includes a bottom portion and a peripheral wall portion, and is mounted to the casing so as to cover the rectifier and the voltage regulator. A protruding portion is formed on an inner surface of the protective cover. The protruding portion is to be fitted into a recessed portion formed on the rectifier and the voltage regulator.

CITATION LIST

Patent Literature

[PTL 1] JP 5395192 B2

SUMMARY OF INVENTION

Technical Problem

In recent years, along with expansion of a cabin space of a vehicle, downsizing of an engine room is demanded. Downsizing is also demanded for the vehicle AC power generator. There is also a demand of downsizing for a device such as the rectifier or the voltage regulator, which is mounted to the vehicle AC power generator. However, in the vehicle AC power generator disclosed in Patent Literature 1, the recessed portion, which is to be fitted over the protruding portion formed on the inner surface of the protective cover, is required to be formed on the rectifier and the voltage regulator. The recessed portion causes limitation on arrangement of, for example, electronic components included in the rectifier and the voltage regulator, and such limitation on arrangement hinders downsizing.

Further, in the vehicle AC power generator disclosed in Patent Literature 1, the protruding portion formed on the inner surface of the protective cover cannot be formed to have a height equal to or larger than a depth of the recessed portion formed on the rectifier or the voltage regulator. Thus, when the protective cover is to be mounted, it is not easy to position the protruding portion with respect to the recessed portion. Therefore, when the protruding portion and the recessed portion are misaligned, there arises a problem in that the protruding portion of the protective cover may interfere with the electronic component included in the rectifier or the voltage regulator to damage the electronic component.

The present invention has been made to solve the problems described above, and has an object to provide a protective cover, which is capable of eliminating need to form a shape that allows fitting to the protective cover on a rectifier or a voltage regulator and is capable of being easily mounted to a rotary electric machine such as a vehicle AC power generator without misalignment.

Solution to Problem

According to one embodiment of the present invention, there is provided a protective cover for a rotary electric machine, including: a bottom portion formed into an approximately circular shape; a side wall, which extends from the bottom portion along an outer periphery of the bottom portion; and an opening portion, which has an approximately circular shape and is formed by an end of the side wall, which is located on a side opposite to the bottom portion, wherein the side wall has a plurality of guide ribs, which are formed on an inner side thereof and are arranged apart from each other along the outer periphery of the bottom portion, wherein each of the plurality of guide ribs extends from the bottom portion toward the opening portion and has a chamfered portion at an end on a side closer to the opening portion, and wherein each of the plurality of guide ribs is formed so that a height of a top portion of each of the plurality of guide ribs from the side wall allows the top portion to be brought into contact with a side surface of the component when the protective cover is mounted to the rotary electric machine.

Advantageous Effects of Invention

With the protective cover according to one embodiment of the present invention, when the protective cover, which is configured to cover the component of the rotary electric machine, is mounted to the rotary electric machine, the plurality of guide ribs formed on the inner side of the side wall of the protective cover are each brought into contact with the side surface of the component to position the protective cover in a radial direction of a rotation axis of the rotary electric machine. As a result, there is provided the protective cover, which is capable of eliminating the need to form the shape that allows the fitting to the protective cover on the component of the rotary electric machine, such as a rectifier or a voltage regulator, and is capable of being easily mounted to the rotary electric machine without misalignment.

DESCRIPTION OF EMBODIMENT

Now, a protective cover for a rotary electric machine according to an exemplary embodiment of the present invention is described referring to the accompanying drawings.

First Embodiment

Figure 1:
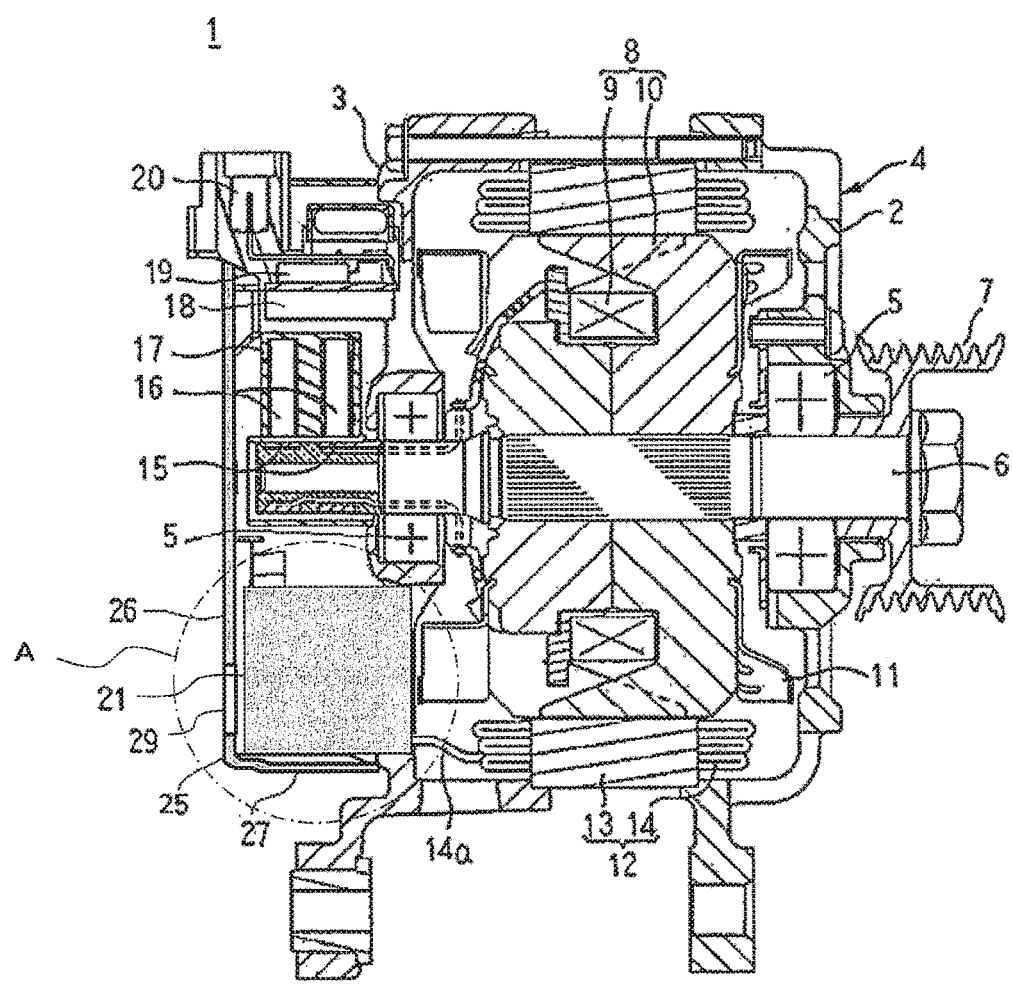
FIG. 1 is a sectional view of a rotary electric machine to which a protective cover according to a first embodiment of the present invention is mounted as seen from a lateral side.
Figure 2:
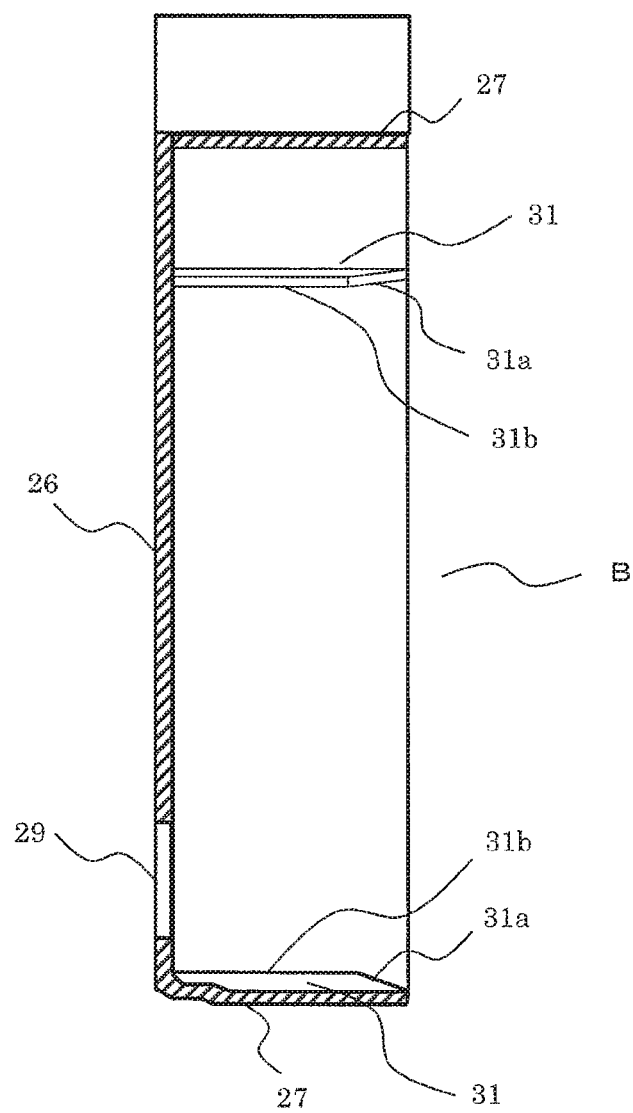
FIG. 2 is a schematic sectional view of the protective cover.
Figure 3:
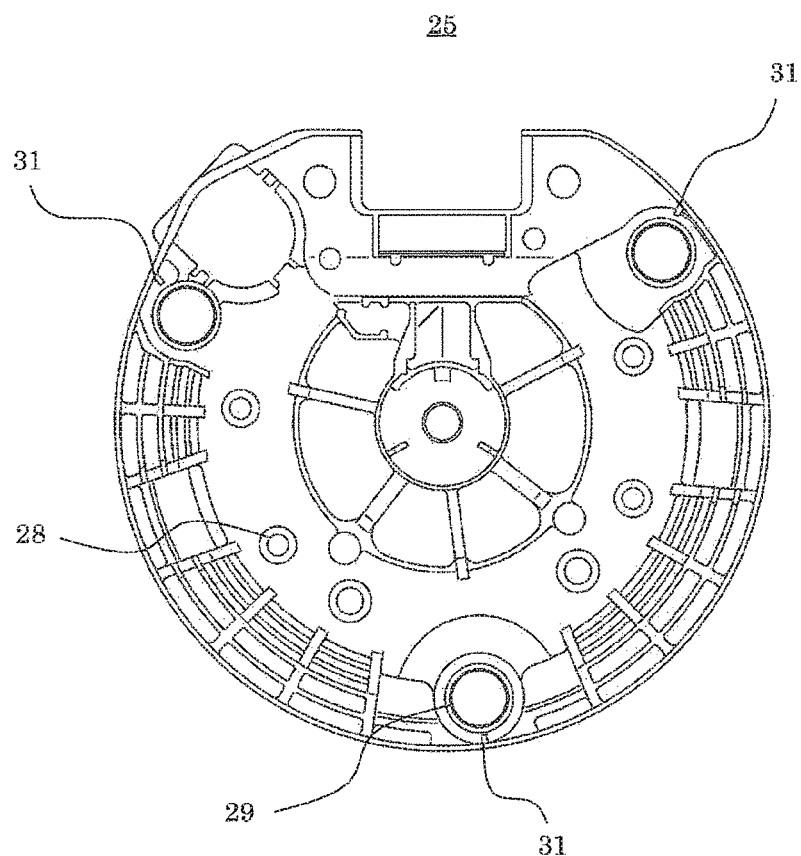
FIG. 3 is a view of the protective cover as seen from an opening portion side.
Figure 4:
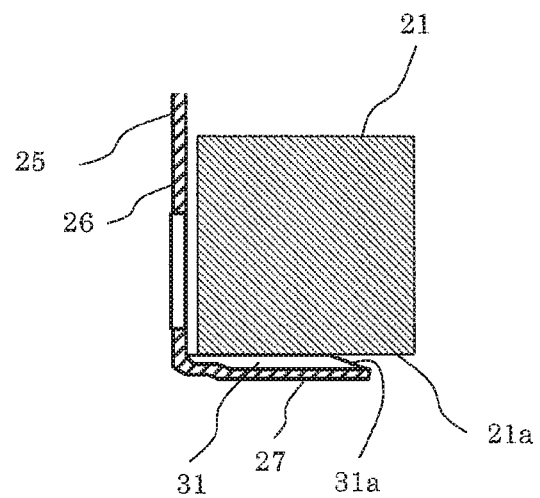
FIG. 4 is an enlarged view of a portion A of FIG. 1.
Figure 5:
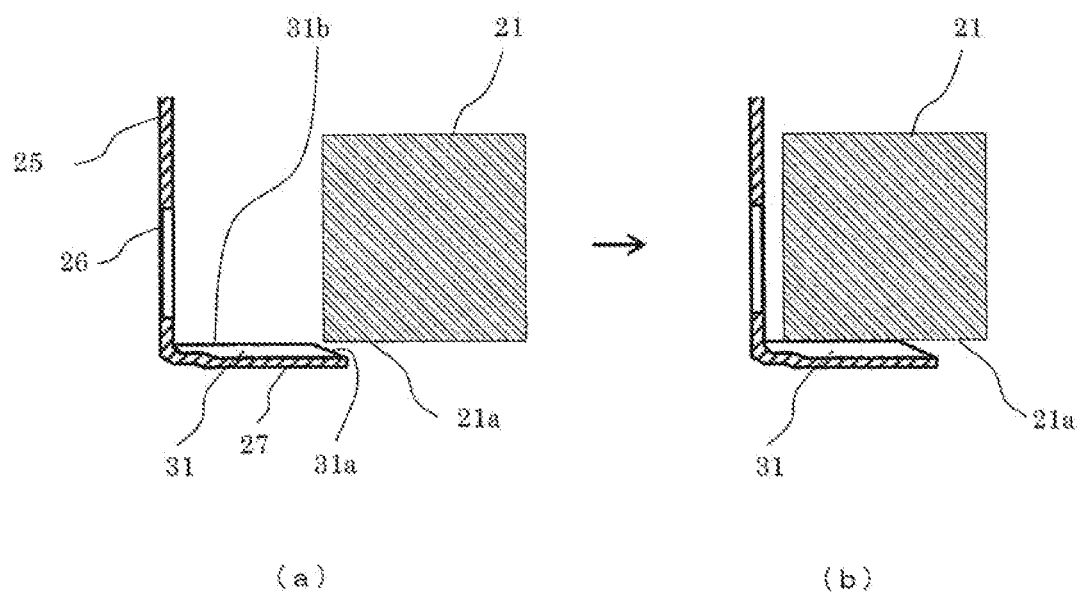
FIG. 5A is a sectional view for illustrating a state of mounting the protective cover to the rotary electric machine.
FIG. 5B is a sectional view for illustrating a state of mounting the protective cover to the rotary electric machine.

FIG. 1 is a sectional view of a rotary electric machine to which a protective cover 25 according to a first embodiment of the present invention is mounted. FIG. 2 is a schematic sectional view of the protective cover 25, and FIG. 3 is a view of the protective cover 25 as seen from an opening portion B side. FIG. 4 is an enlarged view of a portion A of FIG. 1, and FIGS. 5A, 5B are views for illustrating a state of mounting the protective cover 25 to the rotary electric machine. In the first embodiment, a vehicle AC power generator 1 is used as an example of the rotary electric machine.

As illustrated in FIG. 1, the vehicle AC power generator 1 includes a casing 4 formed of a front bracket 2 and a rear bracket 3, which are made of aluminum. A shaft 6 is supported in the casing 4 through intermediation of a pair of bearings 5 so as to be freely rotatable.

One end side of the shaft 6 extends outward from the casing 4 on a front side, and a pulley 7 is firmly fixed thereto. A rotator 8 and a fan 11 are fixed to an intermediate portion of the shaft 6. Inside the casing 4, a stator 12 is fixed so as to surround the rotator 8.

Another end side of the shaft 6 extends outward from the casing 4 on a rear side, and a pair of slip rings 15, which is configured to supply a current to the rotator 8, is fixed thereto. A pair of brushes 16, a brush holder 17, a heat sink 18, a voltage regulator 19, a connector 20, and a rectifying device 21 are arranged outside the casing 4 on the rear side. The pair of brushes 16 are configured to slide against surfaces of the slip rings 15, respectively. The brush holder 17 is configured to accommodate the brushes 16 therein.

The protective cover 25 is mounted to the rear bracket 3 of the casing 4 so as to cover, for example, the brush holder 17, the voltage regulator 19, and the rectifying device 21.

The rotator 8 is a Lundell-type rotator, and includes a field winding 9 and a pole core 10. The field winding 9 is configured to generate magnetic flux when an excitation current is caused to flow therethrough. The pole core 10 is provided so as to cover the field winding 9, and has magnetic poles formed by the magnetic flux. The stator 12 includes a core 13 and a stator winding 14. The core 13 has a cylindrical shape. The stator winding 14 is wound around the core 13, and generates an alternating current based on a change in magnetic flux generated from the field winding 9 along with rotation of the rotator 8. The stator 12 is disposed so as to surround the rotator 8. The core 13 of the stator 12 is supported from both axial sides by the front bracket 2 and the rear bracket 3.

In the vehicle AC power generator 1 having the configuration described above, a field current is supplied from a battery (not shown) through the brushes 16 and the slip rings 15 to the field winding 9 to generate the magnetic flux. By the magnetic flux, N-poles and S-poles are formed on an outer periphery of the pole core 10 in an alternating manner in a circumferential direction of the pole core 10.

Meanwhile, a rotational torque of an engine is transmitted to the pulley 7 through a belt (not shown) to rotate the shaft 6 and the rotator 8. Then, a rotating magnetic field is applied to the stator winding 14 of the stator 12 to generate an electromotive force in the stator winding 14. Further, the AC electromotive force generated in the stator winding 14 is rectified into a direct current by the rectifying device 21. At the same time, a magnitude of an output voltage is regulated by the voltage regulator 19 and is then supplied to the battery and an in-vehicle electric load.

The fan 11 is rotated in conjunction with the rotation of the rotator 8 to suck an outside air from intake holes formed in the protective cover 25. After cooling the heat sink 18 for the voltage regulator 19 and a heat sink for the rectifying device 21, the sucked outside air flows into the casing 4. Then, a direction of flow of the outside air reaching the vicinity of the fan 11 is changed to a circumferential direction of a rotation axis of the vehicle AC power generator 1 by the fan 11. After cooling a portion of the stator winding 14, which extends from the core 13, the outside air is discharged to the outside of the casing 4.

Next, the protective cover 25 and mounting of the protective cover 25 are described with reference to FIG. 2 to FIG. 5B.

The protective cover 25 is made of an insulating resin such as polybutyleneterephthalate (PBT) or Nylon 66. As illustrated in FIG. 2, the protective cover 25 includes a bottom portion 26 and a side wall 27. The bottom portion 26 has an approximately circular shape. The side wall 27 has an approximately cylindrical shape, and extends from the bottom portion 26 along an outer periphery of the bottom portion 26. An end of the side wall 27, which is located on a side opposite to the bottom portion 26, forms the opening portion B having an approximately circular shape so that the protective cover 25 is formed into a cylindrical shape having a closed end.

Further, as illustrated in FIG. 3, a plurality of inner peripheral-side intake holes 28 and a plurality of outer peripheral-side intake holes 29 are formed in the bottom portion 26 of the protective cover 25 as intake holes for a cooling fluid to be sucked into the casing 4 by the fan 11.

As illustrated in FIG. 2 to FIG. 4, the side wall 27 of the protective cover 25 has guide ribs 31, which are formed on an inner side thereof and are arranged at three positions apart from each other along the outer periphery of the bottom portion 26. The three guide ribs 31 are formed to extend from the bottom portion 26 toward the opening portion B. At an end of each of the guide ribs 31, which is located on a side closer to the opening portion B, a chamfered portion 31a is formed.

Next, a state of mounting the protective cover 25 to the vehicle AC power generator 1 is described with reference to FIGS. 5A, 5B. FIGS. 5A, 5B are sectional views for illustrating a state of mounting the protective cover 25 in the vicinity of the rectifying device 21 that is included in the vehicle AC power generator 1.

When the protective cover 25 is to be mounted, as illustrated in FIG. 5A, the chamfered portion 31a formed at a distal end of the guide rib 31 is first brought into contact with a side surface 21a of the rectifying device 21. As a result, the protective cover 25 is guided to an appropriate mounting position. In the present invention, a side surface of each of components such as the rectifying device 21 refers to a surface of each of the components along the rotation axis of the vehicle AC power generator 1.

Next, as illustrated in FIG. 5B, a top portion 31b of the guide rib 31 is brought into contact with the side surface 21a of the rectifying device 21. The protective cover 25 is moved in a mounting direction along the side surface 21a of the rectifying device 21 to be mounted to the vehicle AC power generator 1. For the other two guide ribs 31, the top portion 31b of each of the guide ribs 31 is similarly brought into contact with a side surface of another component.

Then, when the protective cover 25 is mounted to the vehicle AC power generator 1, the top portion 31b of each of the guide ribs 31 is in a state of being held in contact with the side surface of any one of the components included in the vehicle AC power generator 1. Therefore, each of the guide ribs 31 from the side wall 27 is formed so as to have a height equal to or larger than a gap between the side surface of each of the components, with which the top portion 31b of each of the guide ribs 31 is held in contact, and the protective cover 25. The height of each of the guide ribs 31 is set equal to or larger than the gap between the side surface of each of the components and the protective cover 25 in consideration of elastic deformation of the side surface 27 of the protective cover 25, which is caused when the protective cover 25 is mounted to the vehicle AC power generator 1.

As described above, with the protective cover 25 according to the first embodiment, when the protective cover 25 is to be mounted to the vehicle AC power generator 1, the top portions 31b of the plurality of guide ribs 31 formed on the protective cover 25 are brought into contact with the side surfaces of the plurality of components included in the vehicle AC power generator 1, respectively. In this manner, the protective cover 25 can be mounted while being positioned in a radial direction of the vehicle AC power generator 1 with the rotation axis as a center.

With the protective cover 25 according to the first embodiment, misalignment of the protective cover 25 in the radial direction of the rotation axis with respect to the casing 4, which is caused by vibration generated at the time of mounting of the vehicle AC power generator 1 in a vehicle, can be prevented. Further, the guide ribs 31 of the protective cover 25 are formed on the protective cover 25 with use of the gaps between the side surfaces of the components and the protective cover 25. Thus, arrangement and structures of the components are not required to be limited. Specifically, the protective cover 25 can be formed without changing a shape and arrangement of the rectifying device 21.

Although each of the chamfered portions 31a is formed linearly in the first embodiment, a shape of the chamfered portion 31a is not limited thereto. For example, the chamfered portion 31a may be formed into a curved shape.

Figure 6:
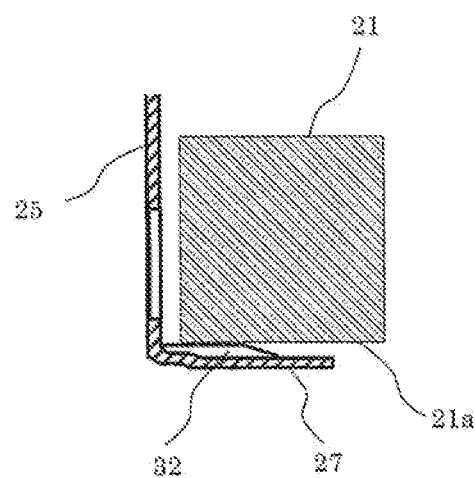
FIG. 6 is a sectional view for illustrating a modification example of the protective cover according to the first embodiment.

Although each of the guide ribs 31 has a length from the bottom portion 26 to the vicinity of the opening portion B in a direction of the rotation axis, the length may be about half as in a case of a guide rib 32 illustrated in FIG. 6. In this case, the side wall 27 is more likely to be elastically deformed, and thus workability is improved.

The plurality of guide ribs 31 formed on the protective cover 25 may have different lengths. Specifically, the guide rib 31 illustrated in FIG. 4 and the guide rib 32 illustrated in FIG. 6, which has a length smaller than that of the guide rib 31 of FIG. 4, may be formed together on the single protective cover 25. In this case, the protective cover 25 is roughly positioned with respect to the vehicle AC power generator 1 with use of the guide rib 31 having a large length. Next, the positioning in the radial direction of the rotation axis of the vehicle AC power generator 1 is performed with use of the guide rib 32 having a small length. As a result, ease of positioning at the time of mounting of the protective cover 25 can be improved.

Figure 7:
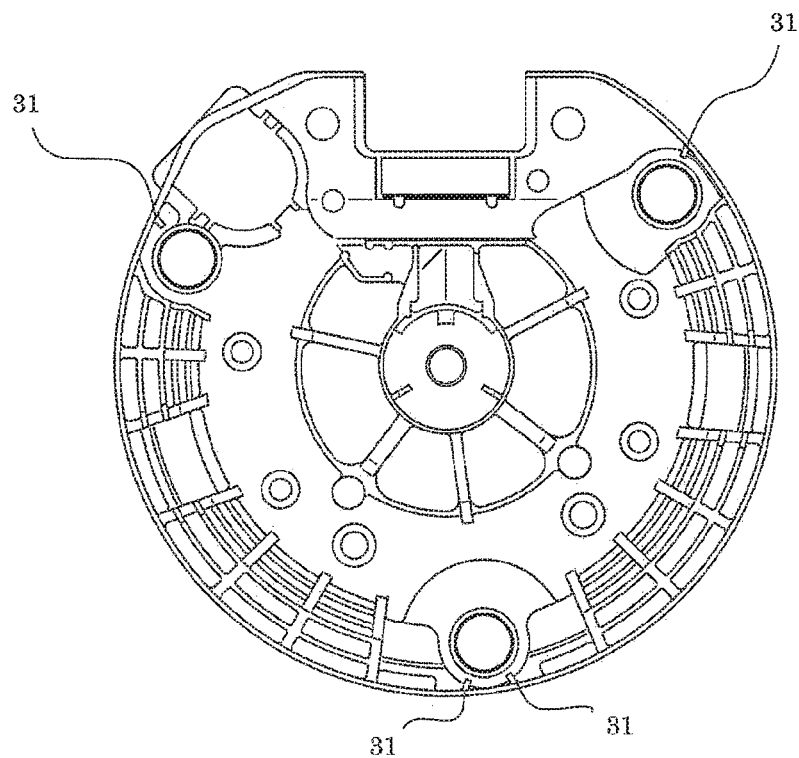
FIG. 7 is a view for illustrating another modification example of the protective cover according to the first embodiment.
Figure 8:
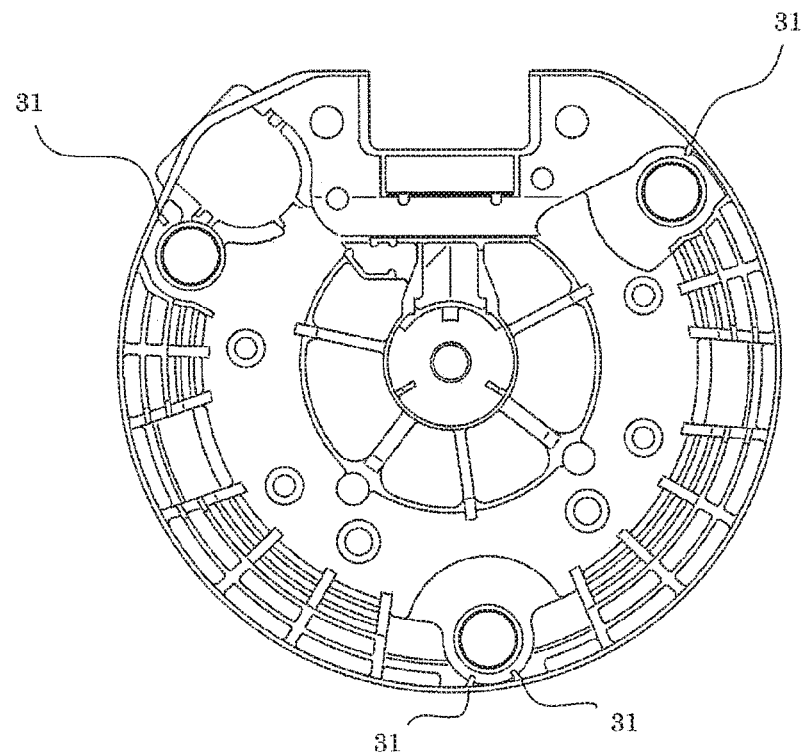
FIG. 8 is a view for illustrating still another modification example of the protective cover according to the first embodiment.

Although the guide ribs 31 are arranged at the three positions in the first embodiment, the arrangement thereof is not limited thereto. For example, the guide ribs 31 may be arranged at four positions as illustrated in FIG. 7, or may be arranged at two positions so as to be opposed to each other as illustrated in FIG. 8. Although one of the guide ribs 31 is brought into contact with the side surface 21a of the rectifying device 21 in the first embodiment, the contact of the guide ribs 31 is not limited thereto. For example, the guide rib 31 may be brought into contact with a side surface of the voltage regulator 19, or may be brought into contact with a side surface of another component.

Further, although the rotary electric machine has been described as the vehicle AC power generator 1 in the first embodiment, the rotary electric machine is not limited thereto. The rotary electric machine may be, for example, a vehicle electric motor or a vehicle generator motor.

REFERENCE SIGNS LIST 1 vehicle AC power generator, 2 front bracket, 3 rear bracket, 4 casing, 6 shaft, 19 voltage regulator, 21 rectifying device, 21a side surface, 25 protective cover, 26 bottom portion, 27 side wall, 31, 32 guide rib, 31a chamfered portion, 31b top portion, B opening portion

The invention claimed is:

1. A protective cover for a rotary electric machine, which is configured to protect a component of the rotary electric machine, comprising:
   a bottom portion formed into an approximately circular shape;
   a side wall, which extends from the bottom portion along an outer periphery of the bottom portion; and
   an opening portion, which has an approximately circular shape and is formed by an end of the side wall, which is located on a side opposite to the bottom portion,
   wherein the side wall has a plurality of guide ribs, which are formed on an inner side thereof and are arranged apart from each other along the outer periphery of the bottom portion,
   wherein each of the plurality of guide ribs extends from the bottom portion toward the opening portion and has a chamfered portion at an end on a side closer to the opening portion,
   wherein each of the plurality of guide ribs is formed so that a height of a top portion of each of the plurality of guide ribs from the side wall allows the top portion to be brought into contact with a side surface of the component when the protective cover is mounted to the rotary electric machine, and
   wherein the chamfered portion of each of the plurality of guide ribs comprises a linear surface without including any recessed portion.

2. The protective cover for a rotary electric machine according to claim 1, wherein a length of at least one of the plurality of guide ribs from the bottom portion to the end, which is located on the side closer to the opening portion, is different from a length of another one of the guide ribs from the bottom portion to the end, which is located on the side closer to the opening portion.

3. The protective cover for a rotary electric machine according to claim 1,
  wherein the component comprises a rectifying device, and
  wherein at least one of the plurality of guide ribs is brought into contact with a side surface of the rectifying device when the protective cover is mounted to the rotary electric machine.

4. The protective cover for a rotary electric machine according to claim 2,
  wherein the component comprises a rectifying device, and
  wherein at least one of the plurality of guide ribs is brought into contact with a side surface of the rectifying device when the protective cover is mounted to the rotary electric machine.

5. The protective cover for a rotary electric machine according to claim 1,
  wherein the component comprises a voltage regulator, and
  wherein at least one of the plurality of guide ribs is brought into contact with a side surface of the voltage regulator when the protective cover is mounted to the rotary electric machine.

6. The protective cover for a rotary electric machine according to claim 2,
  wherein the component comprises a voltage regulator, and
  wherein at least one of the plurality of guide ribs is brought into contact with a side surface of the voltage regulator when the protective cover is mounted to the rotary electric machine.

7. The protective cover for a rotary electric machine according to claim 3,
  wherein the component comprises a voltage regulator, and
  wherein at least one of the plurality of guide ribs is brought into contact with a side surface of the voltage regulator when the protective cover is mounted to the rotary electric machine.

8. The protective cover for a rotary electric machine according to claim 4,
  wherein the component comprises a voltage regulator, and
  wherein at least one of the plurality of guide ribs is brought into contact with a side surface of the voltage regulator when the protective cover is mounted to the rotary electric machine.

9. The protective cover for a rotary electric machine according to claim 2, wherein the length of the at least one of the plurality of guide ribs is from the bottom portion to the end of the chamfered portion of the at least one of the plurality of guide ribs, and
  wherein the length of the another one of the guide ribs is from the bottom portion to the end of the chamfered portion of the another one of the plurality of guide ribs.

* * * * *